Aug. 5, 1958     J. R. NEWCOMER, JR     2,846,149
FASTENER ASSEMBLY
Filed July 12, 1956     2 Sheets-Sheet 1
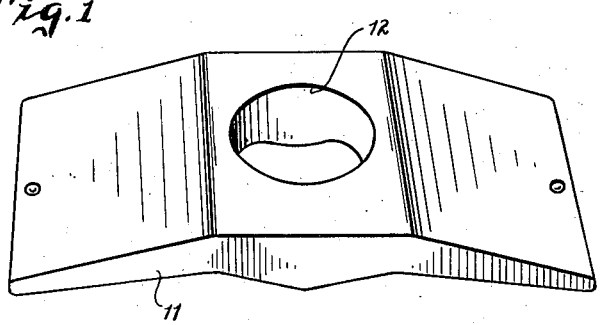
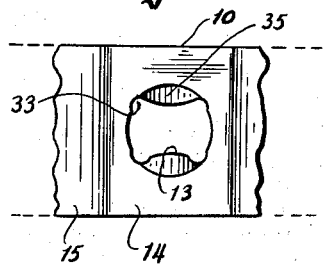
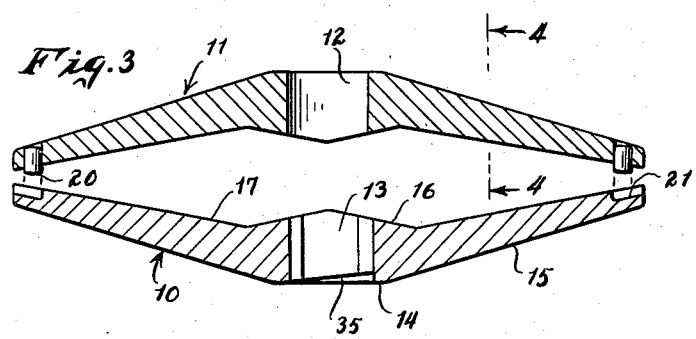
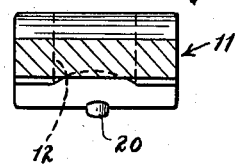
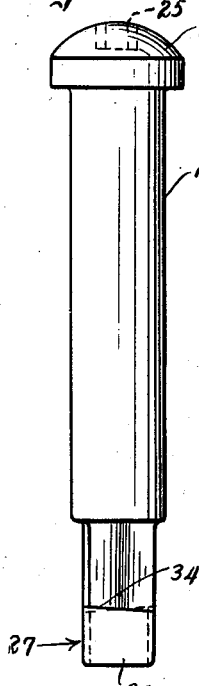
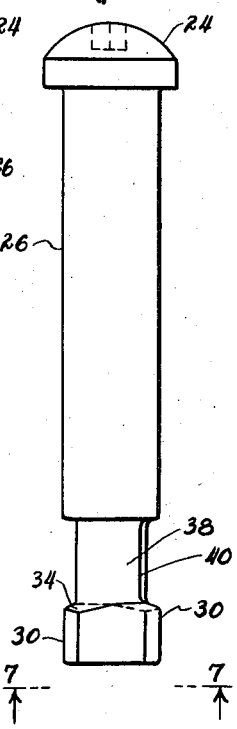
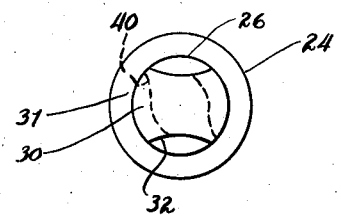
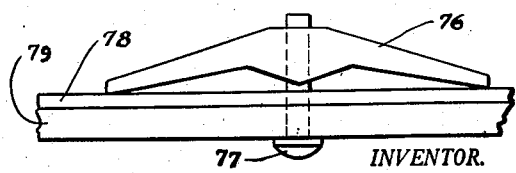
INVENTOR.
JACOB R. NEWCOMER JR.
BY John P. Chandler
his ATTORNEY Aug. 5, 1958   J. R. NEWCOMER, JR   2,846,149
FASTENER ASSEMBLY
Filed July 12, 1956   2 Sheets-Sheet 2
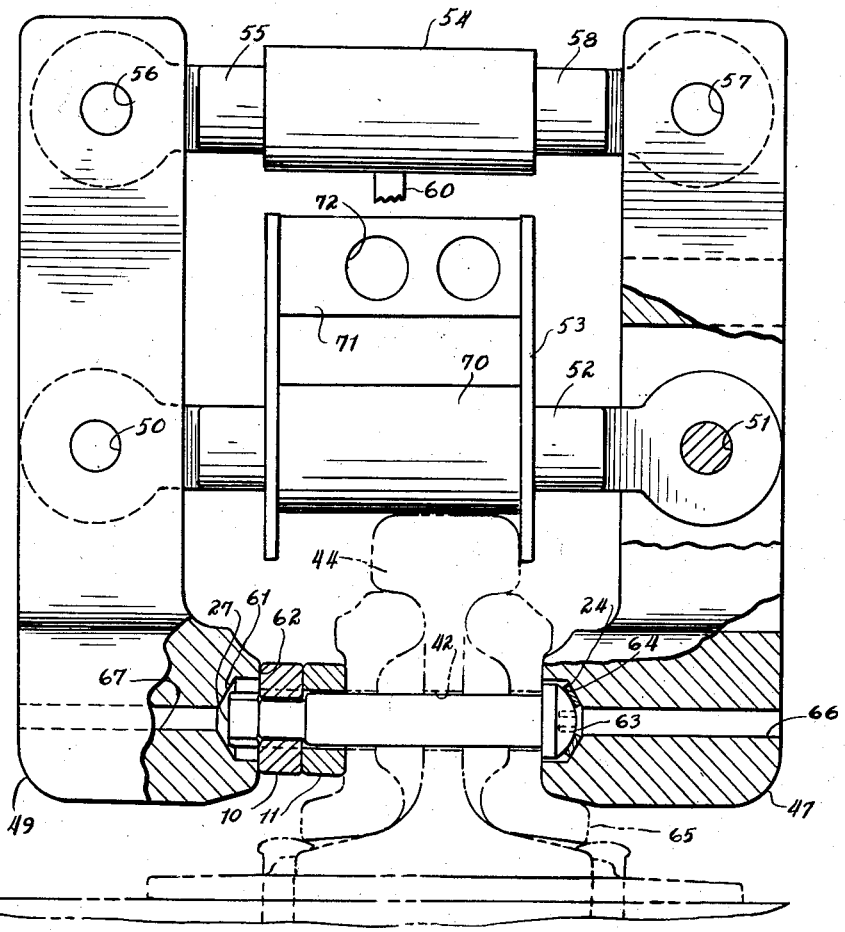
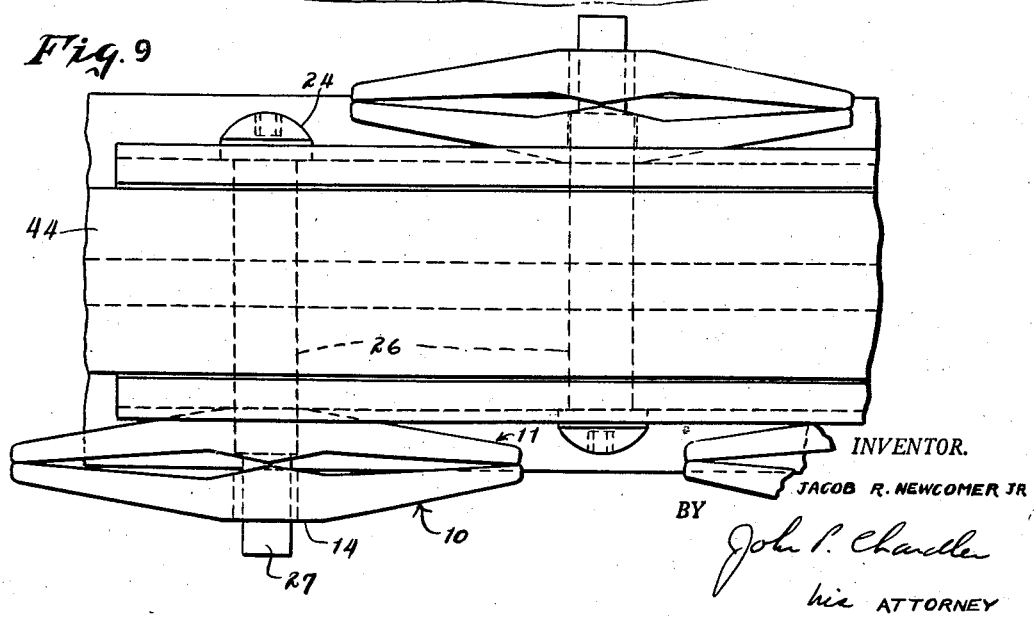
INVENTOR.
JACOB R. NEWCOMER JR
BY
John P. Chandler
his ATTORNEY United States Patent Office 2,846,149
Patented Aug. 5, 1958

2,846,149

FASTENER ASSEMBLY

Jacob R. Newcomer, Jr., Westwood, N. J., assignor to Camloc Fastener Corporation, Paramus, N. J., a corporation of New York Application July 12, 1956, Serial No. 597,479

8 Claims. (Cl. 238—260)

This invention relates to fastener assemblies and relates more particularly to a novel combination of an arched spring plate which is engaged by one of the components of a rotatable stud fastener for securing rail joints or splice bars to the meeting terminals of rails, and wherein more constant tension is maintained on the terminals of the stud or bolt without requiring periodic tightening of nuts as in conventional rail splicing assemblies.

An important object of the invention is to provide an improved spring plate arrangement for applying a substantially constant tension to a bolt and nut type of fastening means.

Another object of the invention is the provision of a novel rotatable stud fastener for rail joints and other similar applications and provided with a novel fastener element which is completely fastened upon a quarter turn of the stud and reverse rotation is prevented as long as the stud is under longitudinal spring tension.

A further object of the invention is to provide a one or two part, spring-like member which is seated under the fastening or nut-like element located at the free end of a headed stud and which is arranged to receive a desired amount of compressive action within the elastic limits of the metal composing the spring or springs. The spring components are of generally rectangular shape and of arched construction and in the case of a two part assembly they are substantially similarly formed and have cooperating male and female elements at their ends to prevent relative fanning rotation between the spring plates.

A further object of the invention is to provide complemental arched spring plates which furnish an approved measure of resistance to compression afforded by the novel quarter turn rotatable stud of the present invention or by a conventional bolt-and-nut assembly.

It will be apparent from the foregoing that another object of the invention is to provide a novel rail joint employing conventional splice bars with standard hole preparation and wherein the installation is initially effected by compressing the two-part spring assembly, as by the use of a tool comprising a screw or cam operated C clamp, while the stud and spring are in place, and while maintaining such compression the nut-like element, which comprises one of the spring plates, is applied to the stud and the latter rotated one quarter turn. The compressive action of the tool is now released and the installation is complete and permanent, usually for the effective life of the rails. As in conventional splice bar installations six studs are used, three for each rail terminal. The C clamp apparatus preferably has six separate clamping elements, all operated by a single hydraulic system so that equal compressive action is applied to each of the six two-part spring assemblies. When the desired measure of compression has been applied the six studs are rotated one-quarter turn and the joint is complete. The compressive tool is mounted on a mobile unit with flanged wheels carried on the tracks.

The installation is speedy and simple, eliminates periodic re-tightening of nuts and the joint is unaffected by vibration or like causes to which such structures are subjected. The spring like members maintain a snug but resilient joint, increase the life of the rails and fishplates and avoid accidents due to loosened joints.

The spring-loaded fastening assembly of the present invention will have many other uses and the individual components, i. e., the opposed, arch-like spring assembly, and the novel quarter turn stud fastener, have separate utility. The best results, however, are achieved by employing the full combination and this combination has particular usefulness as applied to a rail joint assembly.

Yet another object of the invention is to provide a novel rail-splicing assembly wherein all of the studs or fasteners will have substantially equal tension which reduces frozen joints and permits the essential running expansion and contraction of the rails.

In the drawings:

Fig. 1 is a perspective view of the inner arched spring plate.

Fig. 2 is a broken plan view of the outer face of the outer spring plate.

Fig. 3 is an exploded view in longitudinal section taken through the inner and outer spring plates.

Fig. 4 is a transverse section taken on line 4—4 of Fig. 3.

Fig. 5 is a side elevation of the rotatable stud.

Fig. 6 is a similar view of the stud, the view being taken, however, at an angle of 90° to that shown in Fig. 5.

Fig. 7 is a bottom plan view of the stud as shown at 7—7 of Fig. 6.

Fig. 8 shows the method of application of the stud and spring plates in a conventional rail application, the view also showing the hydraulically operated tool for compressing the springs.

Fig. 9 is a broken plan view showing a typical installation.

Fig. 10 is a plan view showing a fastening assembly of the present invention employing only a single arched spring plate.

The spring assembly includes outer and inner oppositely disposed arched spring plates 10 and 11 which have mating nibs at their terminals to prevent relative fanning rotation therebetween. The plates are similarly formed except that the inner plate 11 has a round center role 12 and the outer plate has a center hole 13 of special contour which forms a fastening collar to receive the fastening end of the stud and which is formed with opposed, inwardly extending land portions or ledges 35.

Outer plate 10 has on its outer face a central flat portion 14 and somewhat longer, flat, downwardly inclined terminal portions 15. The central portion which has hole 13 is of greater thickness than are the terminal portions and are of tapered contour when viewed from the side and the outer ends are of substantially half the thickness of the inner ends.

The inner face has a substantially V-shaped central portion 16 and flat terminal portions 17. In the drawing the inner spring plate 11 is shown as having the male components of the mating nibs and these include pins 20 which are received in slots 21 in plate 10.

The stud has a head 24 with a tool receiving opening 25 and a shank section 26 of uniform diameter. The other end of the stud has fasenting means receivable through the outer plate to effect a secure fastening relation between the stud and the spring assembly. This fastening end 27 of the stud is broadly of the bayonet type and has an outer terminal section of non-circular shape formed with two lugs 30 (Fig. 7) having two opposed outer convex faces 31 joined by two opposed concave faces 32. Peripheral faces 31 constitute arcs of a circle and readily pass through round center hole 12 in inner spring plate 11 and the cross sectional contour of the lugs is substantially the same as non-circular center hole 13 with its inwardly extending land portions or ledges 35 in outer plate 10, except that said hole is curved at its corners 33 to relieve strains. The inner faces 34 of the lugs are flat and are disposed at an angle to a plane of rotation of the stud to provide the positive locking action earlier referred to. The outer faces of ledges 35 are complemental to diagonal abutment faces 34 so that the two sets of meeting faces 35—34 have flat engagement with each other when the assembly is in fastened position on the rail terminals. Whether the diagonal or cam faces 35 are built up on the outer face 14 of the outer spring or whether they are recessed is immaterial. The latter construction is preferable. The important consideration is that the direction of the diagonal face be such as to prevent relative rotation of the parts in an unfastening direction except when the springs are compressed by the clamping tool. In other words, the direction of the diagonal is such as to cause the meeting faces to move down inclined planes while being rotated in a fastening direction and opposite rotation causes compression of the springs. These inclined planes prevent movement in an unfastening direction since if a sudden jar were to impart some reverse rotation to the stud a subsequent jar would cause it to turn in a fastening direction.

Between the lugs and the shank the stud is provided with a reduced neck portion 38 of non-circular cross-sectional contour and formed with wing portions 40 formed integrally with and which project from neck 38 and which form stops limiting rotation of the stud within opening 13 in outer plate 10.

The manner of arranging the stud 26 and pairs of inner and outer spring plates 11 and 10 when applied to the rail 44 is shown in Fig. 9. In conventional bolt-and-nut rail joint assemblies it has been found advisable to alternate the heads and nuts on opposite sides of the splice bars. This arrangement is utilized in the present assembly because it is a recognized and approved practice and for the further reason that the length of the spring plate is greater than the distance between adjacent holes 45 in the rails.

The preferred method of installation is to apply compression to all six spring assemblies at the same time. Fig. 8 shows schematically a tool used in compressing the springs. It includes jaws 49 and 47 which are pivotally mounted at 50 and 51 at the terminals of a cross arm 52 mounted in a frame 53. A hydraulic cylinder 54 is located at the upper end of the clamping unit.

Means for moving the lower ends of the jaws inwardly to spring-compressing position include a piston rod 55 pivotally connected at one end 56 with one pivoted jaw and carrying a piston in a piston chamber (not shown) in cylinder 54. The other jaw is pivotally connected at 57 to an arm 58 rigidly secured to cylinder 54. A conduit 60, leading to the piston chamber is connected with a suitable fluid pump.

One jaw 46 has on its forward face a recess 61 of sufficient size to receive terminal 27 of the stud 26 while the remaining area of the forward face 62 of jaw 46 engages flat face 14 of outer spring plate 10. The outer jaw 47 is provided on its forward face with a recess 63 to receive head 24 of the stud.

Within the recess a flat spring washer 64 is suitably secured and when the head contacts this washer it is deformed to the position shown in Fig. 8 and urges the bolt head against the splice bar 65.

A through bore 66 extends from the recess outwardly through the jaw to receive a tool which rotates the stud. A similar bore 67 extends from recess 61 through jaw 46.

A roller 70 rests on the head of the rail and limits downward movement of the clamping assembly. One of the plates forming frame 53 is shown as contacting the rail head and the other plate is spaced therefrom. This arrangement will be reversed in the next clamping unit since the springs will be positioned on the opposite side of the web of the rail. An upper transverse frame member 71 has uncentered holes 72 through which rods (not shown) may pass for supporting the several clamping units in spaced relation.

In the arrangement of Fig. 10 a single arched spring plate 76 is employed with a stud 77 to secure a panel 78 to a structure 79. Plate 76 may be identical with plate 10 and stud 77 may be identical with stud 26 except that it is shorter. The single plate can be used in many applications where the panel is of sufficient length to be engaged by both ends of the arched spring plate. This is not possible in rail joint assemblies using conventional splice bars for the reason shown at the left-hand end of Fig. 9. The length of the splice bar could be increased but that would not be a conventional splice bar.

In the preferred application of the present invention two opposed spring plates are used because the two provide greater deflection than one and this compensates for greater wear which is always present if the joint is subjected to vibration. The structure is also better mechanically since one spring reacts against the other instead of against a fixed structure. If two springs are better than one, especially because of the wear factor, four are better than two and this arrangement can be used if available space is not a factor.

The safety factor against unfastening rotation is substantially the same whether one or more springs are used. The fastener is unique in that the stud must rotate 90° in order to become unsafe and such rotation is virtually impossible with the inclined plane arrangement between the plate and the fastening end of the stud. The condition continues so long as the plate is under compression.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning range of equivalency of the claims are intended to be included therein.

What I claim is:

1. A rotatable stud having a head at one end and formed at its other end with opposed lugs whose inner faces are substantially flat and diagonally inclined in opposite directions, and a reduced neck between the lugs and the shank of the stud provided with radially disposed wing portions.

2. A compression fastening assembly for securing a plurality of members together which are provided with aligned openings, said assembly comprising a stud having a head which engages one of the members and a shank which passes through said openings and which is provided with a non-circular section and with radially extending lugs adjacent said section and having cam surfaces on their inner faces which are inclined relative to a plane normal to the longitudinal axis of the stud, said non-circular section lying between the lugs and the head, and an arched spring plate which is retained under compression against a second one of said members when the assembly is fastened and having a non-circular opening shaped to pass the lugs therethrough and to receive the non-circular section, two opposed walls of said opening having inwardly extending land portions whose outer faces are in juxtaposed relation to the inner faces of the lugs after the stud has been rotated to fastened position, the major diametrical axis of said non-circular shank section being greater than the distance between the land portions and the minor diametrical axis being less than the distance between the land portions to provide stop means limiting rotation of the stud to less than one-half a revolution when the same is turned in a fastening direction, said outer faces of the land portions being inclined complementary to said inner cam faces of the lugs and which are interengaged therewith when the assembly is fastened, the interengagement of the inclined cam faces effecting increasing compression on the spring plate upon rotation of the stud in an unfastening direction and thereby resisting such rotation.

3. The structure recited in claim 2 wherein the outer peripheral faces of the radially extending lugs have substantially the same contour and diameter as the shank, and which are joined by opposed concave surfaces.

4. The structure recited in claim 2 wherein a second arched spring plate having an opening receiving the shank is interposed between said second member to be secured and the first arched spring plate in opposed relation to the latter.

5. A compression fastening assembly for securing a plurality of members together which are provided with aligned openings, said assembly comprising a stud having a head which engages one of the members and a shank which passes through said openings and which is provided with a non-circular section and with radially extending lugs adjacent said section and having cam surfaces on their inner faces which are inclined relative to a plane normal to the longitudinal axis of the stud, said non-circular section lying between the lugs and the head, and inner and outer arched spring plates which are retained under compression against a second one of said members when the assembly is fastened, said plates having aligned openings to receive the shank, the opening in the outer plate being non-circular and shaped to pass the lugs therethrough and to receive the non-circular section, two opposed walls of said opening having inwardly extending land portions whose outer faces are in juxtaposed relation to the inner faces of the lugs after the stud has been rotated to fastened position, the major diametrical axis of said non-circular shank section being greater than the distance between the land portions and the minor diametrical axis being less than the distance between the land portions to provide stop means limiting rotation of the stud to less than one-half a revolution when the same is turned in a fastening direction, said outer faces of the land portions being inclined complementary to said inner cam faces of the lugs and which are interengaged therewith when the assembly is fastened, the interengagement of the inclined cam faces effecting increasing compression on the spring plate upon rotation of the stud in an unfastening direction and thereby resisting such rotation.

6. The structure recited in claim 5 wherein the ends of the spring plates have cooperating pin-and-slot means for preventing relative fan-like rotation between the plates.

7. A rail joint fastener assembly for securing a pair of splice bars to meeting rail terminals, all having aligned openings to receive fastening means therefor, said assembly comprising a plurality of studs, each having a head which engages one of the splice bars and a shank which passes through said openings and which is provided with a non-circular section and with radially extending lugs adjacent said section and having cam surfaces on their inner faces which are inclined relative to a plane normal to the longitudinal axis of the stud, said non-circular section lying between the lugs and the head, and an arched spring plate for each stud which is retained under compression against a second splice bar when the assembly is fastened and having a non-circular opening shaped to pass the lugs therethrough and to receive the non-circular section, two opposed walls of said opening having inwardly extending land portions whose outer faces are in juxtaposed relation to the inner faces of the lugs after the stud has been rotated to fastened position, the major diametrical axis of said non-circular shank being greater than the distance between the land portions and the minor diametrical axis being less than the distance between the land portions to provide stop means limiting rotation of the stud to less than one-half a revolution when the same is turned in a fastening direction, said outer faces of the land portions being complementary to said inner cam faces of the lugs and which are interengaged therewith when the assembly is fastened, the interengagement of the inclined cam faces effecting increasing compression on the spring plate upon rotation of the stud in an unfastening direction and thereby resisting such rotation.

8. The structure recited in claim 7 wherein a second arched spring plate having an opening receiving the shank is interposed between said splice bar and the first arched spring plate in opposed relation to the latter.

References Cited in the file of this patent

UNITED STATES PATENTS

| | | |
|---|---|---|
| 706,469 | Wentzel | Aug. 5, 1902 |
| 952,324 | French | Mar. 15, 1910 |
| 1,147,518 | Lavering et al. | July 20, 1915 |
| 2,247,959 | McComb | July 1, 1941 |